UNITED STATES PATENT OFFICE.

EUGÈNE A. BATONNIER, OF VITRY-LE-FRANÇOIS, FRANCE.

PROCESS OF DYEING WOOD, CLOTH, &c., TO IMITATE MARBLE.

SPECIFICATION forming part of Letters Patent No. 270,371, dated January 9, 1883.

Application filed December 16, 1880. (No specimens.) Patented in France April 5, 1880, No. 135,922; in Belgium June 8, 1880, No. 51,694; in Spain June 20, 1880; in Germany June 22, 1880, No. 12,126; in Austria February 9, 1881, and in Italy March 24, 1881, No. 214.

*To all whom it may concern:*

Be it known that I, EUGÈNE AMÉDÉE BATONNIER, a citizen of the Republic of France, and residing at Vitry-le-François, France, have invented an Improved Method of Dyeing Wood, &c., in Imitation of Marble, (for which a French patent, April 5, 1880; Belgian patent, June 8, 1880; German patent, June 22, 1880; Austrian patent, February 9, 1881; Italian patent, March 24, 1881, and Spanish patent, June 20, 1881, have been granted,) of which the following is a specification.

My invention consists of an improved method of producing imitations of marble and other analogous stone upon plaster, wood, cloth, or canvas, metals, and the like, as more fully described hereinafter.

I carry my invention into effect by coating the surface with a paste, which I term a "reserve," so applied as to leave portions of the surface bare, and then applying color to this surface along the edges of the paste. When it is desired to produce an imitation of marble upon plaster, for example, I proceed in the following manner: The surface of the plaster is first covered with priming or size, in order to obtain the proper adhesion of the particles of whitening or plaster which have not sufficient cohesion. A very thick paste is then prepared, made from carbonate of lime and wheat, rye, maize, or potato flour, or other amylaceous substance, with water in sufficient quantity to impart the proper degree of consistency to the paste. The proportion of whitening to flour may be varied according as it is desired to make the paste more or less hard or more or less adhesive. Any other inert substance may be employed in lieu of the whitening—such, for example, as sulphate of baryta, kaolin, and the like—or any other binding substance may be employed in lieu of the flour—such, for example, as starch, dextrine, albumen, wax, or any other substance capable of producing the same effect. This paste, which I term the "reserve," is then applied to the surface to be marbleized, so as to leave the surface bare in channels on lines corresponding to the veins or marbleizing to be produced, and the paste is then allowed to dry. Suitable colors are then applied by means of a brush or sponge, in order to produce the color of the marble which it is desired to imitate, care being taken to follow the outlines or edges of the pieces of paste or reserve. This should be done with some care, as the edges of the paste present more or less irregularities and cracks, which permit the color to penetrate the surface and produce the desired marbleized effect. There is, however, no objection to passing the brush or sponge over the edges of the paste. The color is then allowed to dry, after which the paste is removed with a putty-knife or other suitable flat and edged tool. The veins and marbling are then examined, and the veins joined or finished where they may have been left incomplete, and when the surface is dry it is varnished with polishing or other varnish.

The coloring-matter employed is formed of decoctions or solutions of colors in water, and therefore does not make a coating on the surface of any appreciable thickness, as in the case of ordinary oil colors, so that a perfectly smooth and uniform surface is obtained.

The various colors which may be employed embrace all mineral, vegetable, and animal colors employed in dyeing—such as fuchsine, murexide, aniline, saffronine, curcumine, picric acid, extract of campeche, cachou, brazileine, Hoffman violet, aniline blue, and the like—as well as metallic salts which are capable of yielding insoluble colored precipitates by double decomposition.

The reserve itself may be colored so as to leave behind it on the surface to be marbled a portion of its color, whereby most varied effects may be obtained.

The process hereinabove described with reference to plaster may be applied in the same manner to wood, cloth, metals, or any similar substance capable of receiving a preliminary coating of paint. In such cases, instead of operating upon the bare surface, as when plaster is used, the surface is first covered with oil and turpentine, color or paint, or equivalent coating. A coating composed of a solution of a metallic salt capable of yielding a metallic precipitate by reaction may be applied. Another salt capable of producing this reaction with the salt previously applied is then introduced into the reserve, and wherever this reserve has been applied and subsequently removed the desired color will appear with marked effect.

Ordinary painting may be combined with this process when practicable on condition that a very thin coat of paint is employed, so as to allow of subsequent polishing for the purpose of obtaining a surface as smooth as that of natural marble.

Coloring substances used in dyeing may be employed in conjuction with mordants, the latter being applied before applying the color.

I claim as my invention—

The mode herein described of producing imitation marbled surfaces, which mode consists in first applying a layer of paste to the surface with intervening channels or spaces, then applying color to the spaces or channels, removing the paste, and finally polishing the surface, substantially as set forth.

In testimony whereof I have signed my name to this specification in the presence of two subscribing witnesses.

EUGÈNE AMÉDÉE BATONNIER.

Witnesses:
JOSEPH DELAGER,
ROBT. M. HOOPER.